United States Patent Office 2,787,630
Patented Apr. 2, 1957

2,787,630

PREPARATION OF BISCHLOROFORMATES

Manfred Katz, Stillwater, Okla., and Emerson L. Wittbecker, West Chester, Pa., assignors to E. I. du Pont de Nemours and Company, Wilmington, Del., a corporation of Delaware No Drawing. Application November 17, 1954,
Serial No. 469,539

6 Claims. (Cl. 260—463)

This invention relates to a new and useful chemical process. More particularly it relates to a process for the preparation of the bischloroformate of a 2,2-disubstituted-1,3-propanediol.

It is an object of the present invention to provide a novel and useful process for the preparation of the bischloroformate of a 2,2-disubstituted-1,3-propanediol.

This and other objects will become apparent in the course of the following specification and claims.

The compounds prepared by the process of this invention are disclosed in Ludwig et al., "J. A. C. S." 73, 5779 (1951).

In accordance with the present invention a compound of the formula:

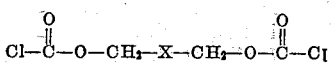

wherein X is a member of the group consisting of cyclohexylidene and

wherein R and R' are lower alkyl groups, the sum of whose carbon atoms is no more than 5, is prepared by reacting the corresponding diol with phosgene in the presence of an inert ether solvent.

The following examples are cited to illustrate the invention. They are not intended to limit it in any manner.

Example I 415 parts of phosgene are condensed in 520 parts of dioxan in a vessel equipped with a Dry Ice condenser. A solution of 182 parts of 2,2-dimethyl propanediol in 365 parts of dioxan is formed by heating the components to 50° C. This latter solution is gradually added with stirring to the phosgene-dioxan solution, maintaining the temperature of the combined components at 0° C. After standing for 10 hours, the excess phosgene and the hydrogen chloride formed are removed by distillation under reduced pressure (approximately 5 mm. mercury). The residue is distilled at a pressure of from 0.5 to 1 mm. mercury. A 90% yield, based on the diol of 2,2-dimethyl propanediol bischloroformate boiling at 79° C. at 0.5 mm. mercury is obtained.

A repetition of the above reaction wherein benzene is substituted for dioxan results in a yield of 25%.

A second repetition of the bischloroformate preparation described above is performed in the presence of chloroform as solvent. A yield of only 21% is obtained.

Example II 100 parts of phosgene are condensed in 250 parts of dioxan in a vessel equipped with a Dry Ice condenser. A solution of 72 parts of 1,1-cyclohexanedimethanol in 400 parts of dioxan is slowly added to the phosgene-dioxan solution, maintaining the reactants at 0° C. After standing 10 hours, excess phosgene and hydrogen chloride formed are removed under reduced pressure. The bischloroformate of 1,1-cyclohexanedimethanol formed has a boiling point of 110 to 113° C. at 5 mm. pressure.

Example III 250 parts of phosgene are condensed in 250 parts of tetrahydrofuran. A solution of 105 parts of 2,2-dimethyl propanediol in 200 parts of tetrahydrofuran is slowly added to the phosgene-tetrahydrofuran solution. After standing overnight, excess phosgene and the hydrogen chloride formed are removed and the product is purified by distillation under reduced pressure. An 89% yield is obtained.

The yield advantage in the use of an ether as a reaction medium in the preparation of the compound of the present invention is illustrated in the comparative data presented in Example I. Any ether, inert and liquid under the reaction conditions, is suitable. Those liquid and having a low vapor pressure at room temperature, thereby permitting their use in an open system and which are non-toxic are preferred. Suitable materials include the lower dialkyl ethers such as diethyl, ethyl propyl, di-isopropyl, the lower alkyl ethers of the low glycols such as the diethyl ether of ethylene glycol, cyclic ethers such as dioxan, tetrahydrofuran, tetrahydropyran and the like. The cyclic ethers are of particular utility. Mixtures of such materials may be employed. Where a pressure system is employed, ethers which are normally gaseous under room conditions, such as dimethyl ether may be used. The ether solvent need not be pure to attain the improved yields. For instance, as much as 50% of the reaction medium may be benzene. The presence of at least about two mols of ether for each mol of hydrogen chloride generated in the reaction has been found desirable.

It is preferred that the reaction occur in the presence of an excess of phosgene to suppress carbonate formation. For this reason it is convenient to dissolve each reactant in a portion of the solvent employed and then add the solution of the diol to that of the phosgene. A low temperature of around 0° C. or lower is advantageous in retaining the phosgene in solution until after the diol has been added. At times it is necessary to heat the diol-solvent component prior to its addition to the phosgene-ether solution in order to dissolve the diol. This warm diol solution may then be added to the cold phosgene solution permitting the temperature of the reaction to rise slowly. When a cold diol solution is added to a cold phosgene solution the combined materials may be gently heated to hasten the reaction. It is preferred to keep the temperature below about 50° C.

The reaction occurs very rapidly without any sensible indications. In the interest of more nearly quantitative yields it is preferred to permit the reactants to stand from about 6 to about 10 hours before recovery of the product. Excess phosgene and the hydrogen chloride formed in the reaction are distilled off. The product is then separated from solvent and purified by distillation under reduced pressure. Solvent and phosgene may be recycled and employed in the production of subsequent batches.

The compounds of this invention are useful in the preparation of urethanes by reaction with ammonia or amines having replaceable hydrogen and other derivatives by conventional bischloroformate reactions. They are also useful in the preparation of polymers which find utility as coatings and shaped articles. The following example illustrates the utility of the product in the preparation of a fiber.

Example IV 57.2 parts of the bischloroformate of 2,2-dimethyl-1,3-propanediol, prepared as described in Example I, dissolved in 750 parts of chloroform are added to a rapidly stirred emulsion of 56.6 parts of 4,4'-isopropylidenedianiline, 58.3 parts of sodium carbonate, 1500 parts of chloroform and 1,000 parts of water at room temperature. After 15 minutes the emulsion is broken by addition of n-hexane. The polymer precipitates. It is collected by filtration and washed with an aqueous solution of 1% hydrochloric acid to render unreacted amine water soluble. This is followed by a water wash until the collected polymer is acid free. The yield of polyurethane is essentially quantitative, based on the amine. The polymer has an inherent viscosity of 1.21, and a polymer melt temperature of 315° C. It is soluble at room temperature in acetone, methyl ethyl ketone, methyl ethyl ketone/methanol (60/40), acetone/methanol (88/12), tetrahydrofuran and dimethylformamide.

The polymer is dissolved in an ethanol/methylethylketone (20/80) mixture to produce a solution containing 24% solids. The solution is extruded through a spinneret at 68° C. under 140 pounds per square inch pressure through a 5-hole spinneret, each hole having a diameter of 0.1 mm. into a 100° C. air stream. The yarn is drawn to 3.3 times its original length over a 90° C. hot pin and is collected at a wind-up speed of 125 yards per minute. The yarn is boiled off taut and then boiled off relaxed. It has a tenacity of 2.1 grams per denier, an elongation of 38% and an initial modulus of 35 grams per denier.

While the invention has been described with particular reference to the bischloroformates, it will be obvious to those skilled in the art that other corresponding bishaloformates can be similarly prepared, for instance, the bisbromoformate can be prepared by using carbonylbromide liquid in place of phosgene.

Many equivalent modifications will be apparent to those skilled in the art from a consideration of the foregoing specification without a departure from the inventive concept.

What is claimed is:

1. A process for preparing a compound of the formula:

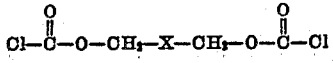

wherein X is a member of the group consisting of cyclohexylidene and

wherein R and R' are lower alkyl groups, the sum of whose carbon atoms is no more than 5, which comprises adding a cyclic ether solution of a diol of the formula:

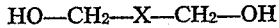

to a cyclic ether solution of phosgene and thereafter separating the product from the reaction mass by distillation.

2. The process of claim 1 wherein the cyclic ether is tetrahydrofuran.

3. The process of claim 1 wherein the cyclic ether is dioxan.

4. A process for preparing the bischloroformate of 1,1-cyclohexanedimethanol which comprises adding a cyclic ether solution of 1,1-cyclohexanedimethanol to a cyclic ether solution of phosgene and thereafter separating the product from the reaction mass by distillation.

5. The process of claim 4 wherein the cyclic ether is tetrahydrofuran.

6. A process for preparing the bischloroformate of pentaglycol which comprises adding a cyclic ether solution of pentaglycol to a cyclic ether solution of phosgene and thereafter separating the product from the reaction mass by distillation.

References Cited in the file of this patent

UNITED STATES PATENTS

| | | |
|---|---|---|
| 2,307,679 | Hechenbleikner | Jan. 5, 1943 |
| 2,403,113 | Muskat et al. | July 2, 1946 |
| 2,587,437 | Bralley et al. | Feb. 26, 1952 |

OTHER REFERENCES

Ludwig et al.: J. A. C. S. 73, p. 5779 (1951).